(12) United States Patent
Park et al.

(10) Patent No.: US 6,731,753 B2
(45) Date of Patent: May 4, 2004

(54) PERSONAL DIGITAL ASSISTANT/ TELEPHONE COMBINATION DEVICE

(75) Inventors: Sung-Sun Park, Kyongsangbuk-do (KR); Young S. Kim, Los Altos, CA (US)

(73) Assignee: Samsung Electronics Co., Ltd. (KR)

( * ) Notice: Subject to any disclaimer, the term of this patent is extended or adjusted under 35 U.S.C. 154(b) by 373 days.

(21) Appl. No.: 09/808,437

(22) Filed: Mar. 14, 2001

(65) Prior Publication Data

US 2001/0034229 A1 Oct. 25, 2001

Related U.S. Application Data

(63) Continuation-in-part of application No. 09/755,376, filed on Jan. 4, 2001.
(60) Provisional application No. 60/189,203, filed on Mar. 14, 2000.

(30) Foreign Application Priority Data

Dec. 28, 2000 (KR) .......................................... 2000-83700

(51) Int. Cl.[7] ............................................... H04M 1/00
(52) U.S. Cl. .............................. 379/433.07; 379/433.13
(58) Field of Search ..................... 379/433.13, 433.01, 379/433.07, 433.04, 368, 433.12; 455/475.8, 575.3

(56) References Cited

U.S. PATENT DOCUMENTS 5,646,649 A  *  7/1997  Iwata et al. .............. 455/575.8

FOREIGN PATENT DOCUMENTS

JP              4-23547  *  1/1992  ............ 379/433.01

* cited by examiner

Primary Examiner—Jack Chiang
(74) Attorney, Agent, or Firm—Dilworth & Barrese LLP

(57) ABSTRACT

A personal digital assistant (PDA)/telephone combination device comprising a base, a screen coupled to the base, and a keypad hingably mounted to the base. The keypad provides a partial view of the screen in a lowered position and a full view of the screen in a raised position. The keypad comprises a window that provides the partial view of the screen when the keypad is in a lowered position. A cover hingably mounts to the base wherein the keypad is located between the cover and the base. The cover rotates between an open position and a closed position. The screen displays telephone information when the keypad is in a lowered position. Control buttons coupled to the base are covered when the cover is in the closed position and uncovered when the cover is in an open position. In an additional embodiment, control buttons coupled to the base are uncovered when the cover is in both the closed position and the open position.

19 Claims, 19 Drawing Sheets

PERSONAL DIGITAL ASSISTANT/ TELEPHONE COMBINATION DEVICE

PRIORITY

This application is a continuation-in-part application of U.S. application Ser. No. 09/755,376, filed on Jan. 4, 2001, and claims priority to a provisional application entitled "Personal Digital Assistant/Telephone Combination Device", filed in the U.S. Patent and Trademark Office on Mar. 14, 2000 and assigned Ser. No. 60/189,203, and also claims priority to an application entitled "Personal Digital Assistant/Telephone combination Device" filed in the Korean Industrial Property Office in Dec. 28, 2000 and assigned Ser. No. 2000-83700, the contents of both of which are incorporated by reference.

BACKGROUND OF THE INVENTION

1. Field of the Invention

The present invention relates generally to a portable terminal, and in particular, to a personal digital assistant (PDA)/telephone combination device.

2. Description of the Related Art

In general, portable terminals are categorized into a bar type, a flip type, and a folder type according to their outer appearances and into a wrist type and a neck wearable type according to where they are carried. Furthermore, portable terminals are divided into terminals for voice communication, for picture transmission, and for Internet access according to their functions. Although a large number of individuals carry portable terminals that can be classified into the bar type, the flip type, and the folder type in today's mobile society, it is expected that they will increasingly use such portable terminals as can be carried in diverse ways.

For example, a known folder-type terminal includes a main housing, a folder connected to the main housing, and a hinge means by which the folder can be opened to a predetermined angle from the main housing. The main housing may have a data input means therein and the folder may have a data output means thereon and vice versa. Typically, a microphone is in the main housing and a speaker is on the folder.

A keypad having a plurality of keys is used as the data input means and an LCD (Liquid Crystal Display) as the data output means. For the data input means a touch screen or a touch pad may also be used.

Along the developmental trend of portable terminals toward lightweight and miniaturization a main body, an LCD, and a keypad are being scaled down in size. However, as the LCD becomes smaller, it is more difficult to view displayed data and as the keypad becomes smaller, it is more difficult to enter data. These technological constraints set a limit on miniaturization of portable terminals. Satisfying miniaturization of a portable terminal while maintaining the size of an LCD and a keypad unchanged is a very challenging issue.

Furthermore in view of popular use of Internet communication and E-mail, the need for portable terminals to satisfy the above purpose is pressing. That is, what is needed is a PDA/telephone combination device that is easy to use.

SUMMARY OF THE INVENTION

A general object of the present invention is to provide a portable digital terminal that incorporates cellular telephone capabilities and personal digital assistant capabilities.

Another object of the present invention is to provide a portable digital terminal having three housing portions connected by a single hinge in order to extend a data input function and increase user convenience.

A further object of the present invention is to provide a portable digital terminal having a key input unit housing between a main housing and a speaker housing.

Still another object of the present invention is to provide a portable digital terminal where a wide screen LCD is covered in a main housing when the portable digital terminal functions as a cellular phone.

The foregoing and other objectives of the present invention are achieved by a personal digital assistant (PDA)/telephone combination device comprising a base, a screen coupled to the base, and a keypad hingably mounted to the base. The keypad provides a partial view of the screen in a lowered position and a full view of the screen in a raised position. The keypad comprises a window that provides the partial view of the screen when the keypad is in a lowered position. A cover hingably mounts to the base wherein the keypad is located between the cover and the base. The cover rotates between an open position and a closed position. The screen displays telephone information when the keypad is in a lowered position. Control buttons coupled to the base are covered when the cover is in the closed position and uncovered when the cover is in an open position. In an additional embodiment, control buttons coupled to the base are uncovered when the cover is in both the closed position and the open position.

According to another aspect of the present invention, a PDA/telephone combination device includes a main housing, a speaker housing raised from and lowered to the main housing, hinge means by which the main housing is connected to the speaker housing, and a key pad housing that is connected to the hinge means, is disposed between the main housing and the speaker housing to be raised from and lowered to the main housing, and has a plurality of keys.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description well-known functions or constructions are not described in detail since they would obscure the invention in unnecessary detail.

Figure 1:
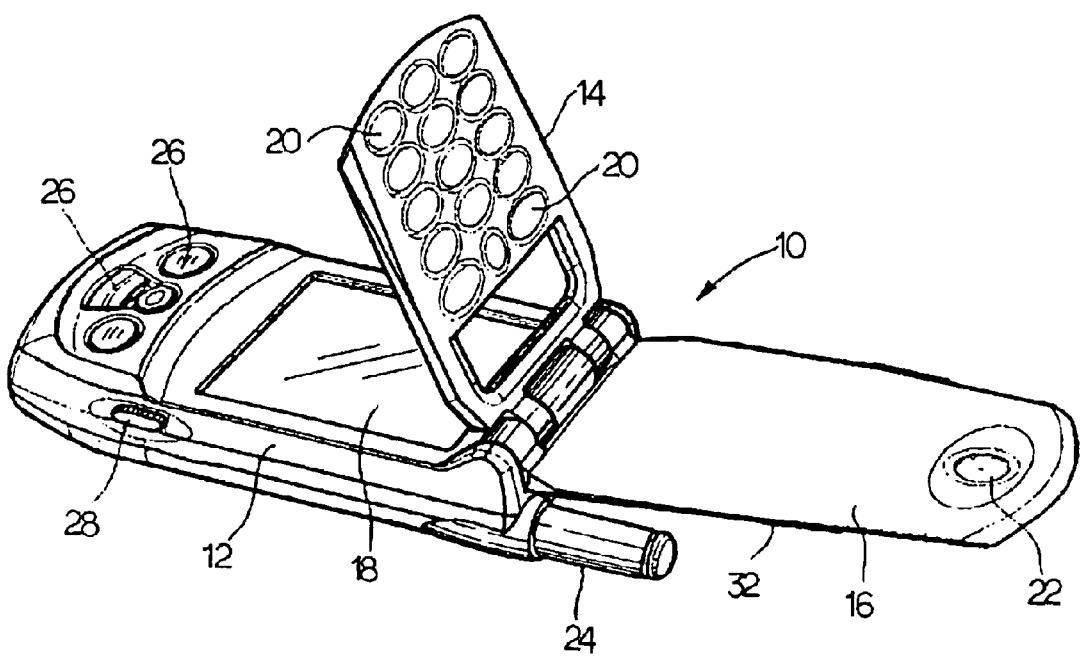
FIG. 1 is a perspective view of a first embodiment of a PDA/telephone combination device with a cover opened and a telephone keypad raised to expose a PDA display.

FIG. 1 is a perspective view of a first embodiment of a personal digital assistant (PDA)/telephone device 10. The device 10 includes a base 12 with a keypad 14 and a cover 16 hingably mounted to one end of the base 12. The telephone keypad 14 hingably mounts between the base 12 and the cover 16, covering a display 18 when lowered and exposing the display 18 when raised. The device 10 includes a stencil (not shown) for contacting the display 18. The display 18 is preferably a touch-screen display, while the keypad 14 is of the type conventionally used in cellular phones.

In one embodiment, the keypad 14 has a lock that secures it to the base 12. In another embodiment, the keypad 14 freely rotates. The keypad 14 has buttons 20 for operating the device 10 as a telephone. The cover 16 includes a speaker 22, which a user may place against his ear in order to hear a conversation. An antenna 24 provides wireless radio transmission and reception for the device 10. Operational buttons 26 mount to the base 12 and are used for phone and PDA functions. Wings 32 along either side of the cover 16 assist in raising and lowering the cover 16. Function buttons 28 are on either side of the device 10. A battery (not shown) is carried by either the cover 16 or the base 12.

Figure 2:
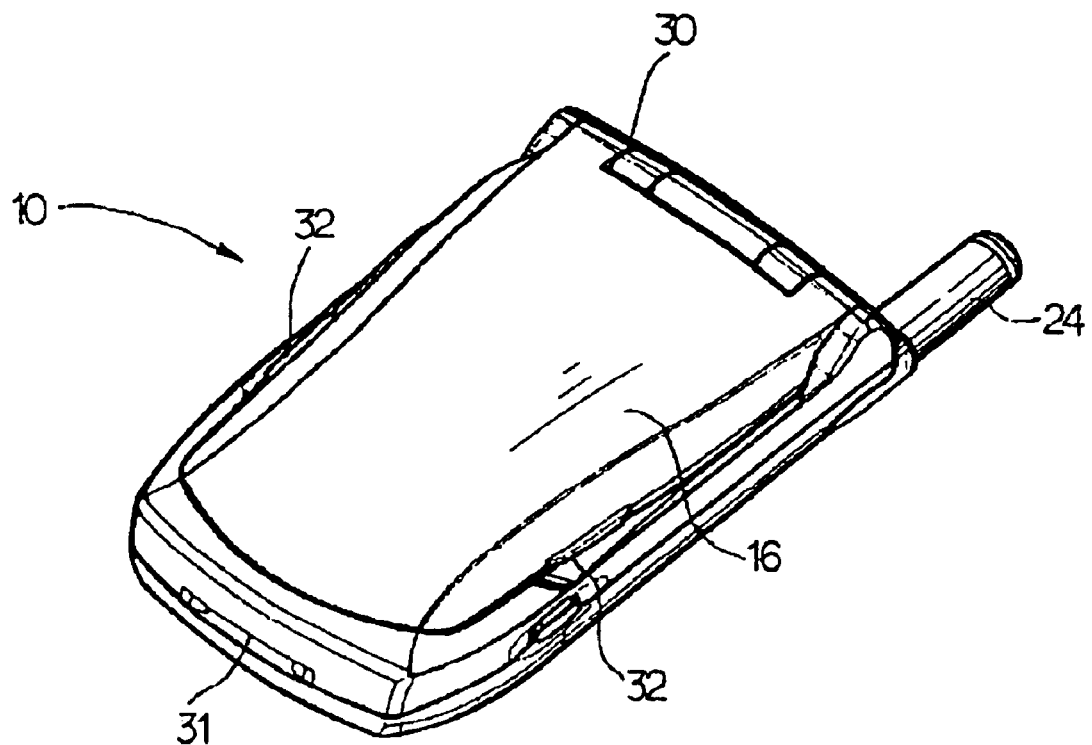
FIG. 2 is a perspective view of the device shown in FIG. 1 with the cover in a closed position.

FIG. 2 shows the device 10 with the cover 16 in a closed position. In the closed position, the cover 16 protects the operational buttons 26. In one embodiment, the cover 16 has a latch that keeps it closed, while in another embodiment the hinge 30 biases the cover 16 in an open or closed position. A microphone 31 is disposed along the bottom of the base 12.

Figure 3:
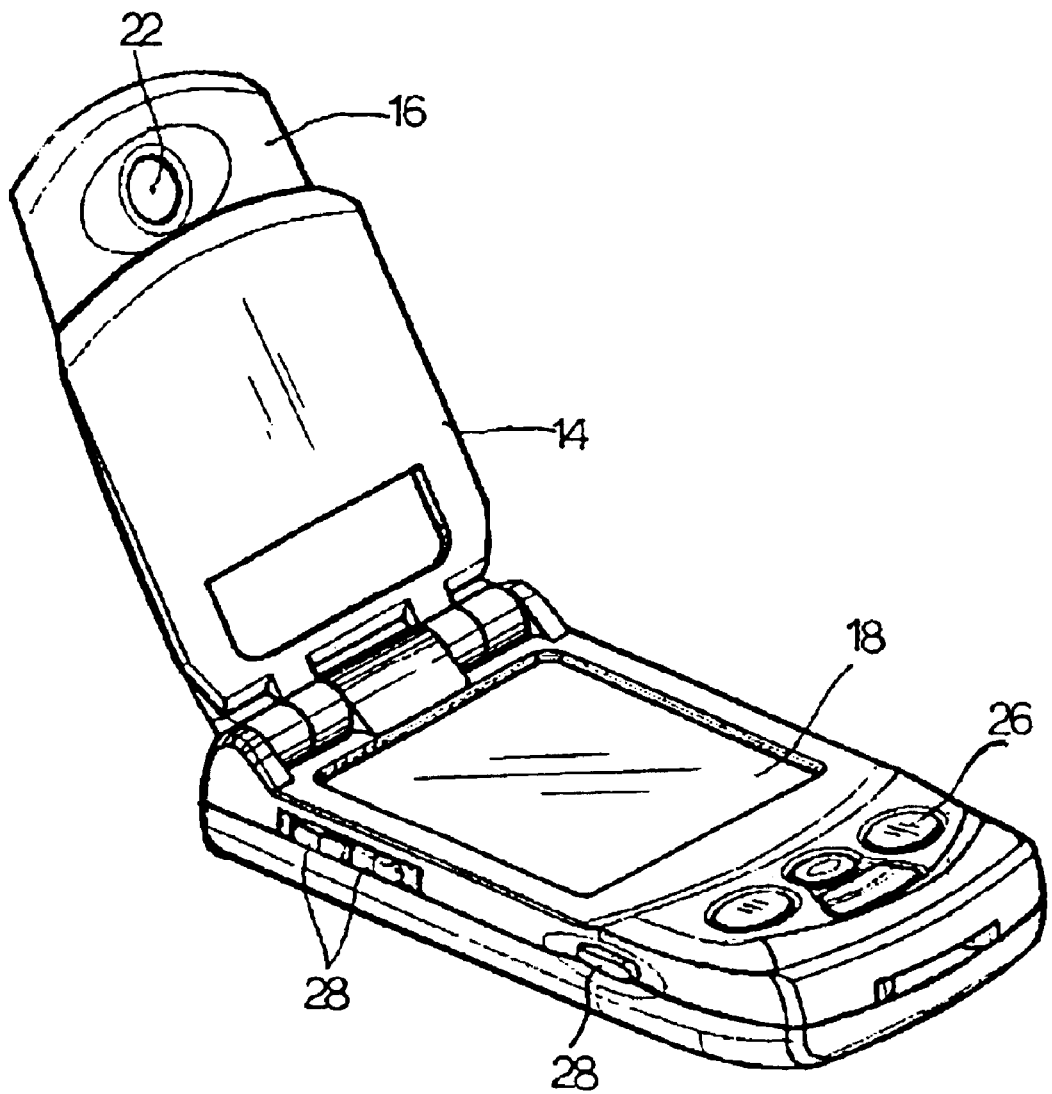
FIG. 3 is a perspective view of the device shown in FIG. 1 with the keypad raised so that it is flush with the cover.

FIG. 3 shows the cover 16 and the keypad 14 in a raised position. This position is desirable for the device 10 to operate as a PDA, with the screen 18 fully exposed in an alternate embodiment, the device 10 functions as a phone with the keypad 14 in the raised position by transmitting information from a memory (not shown) stored in the device 10 to a recipient device using wireless communication. Speaker 22 remains uncovered.

Figure 4:
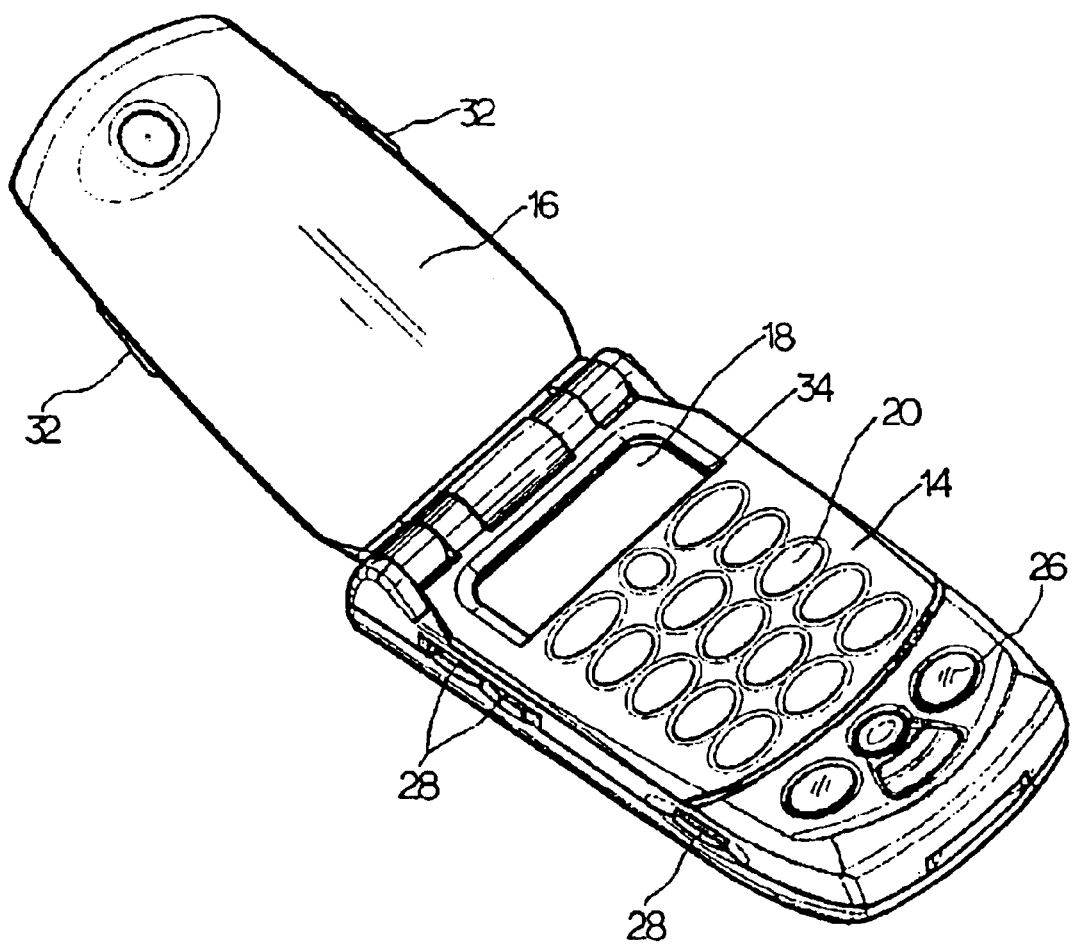
FIG. 4 is a perspective view of the device shown in FIG. 1 with the keypad lowered so that it is flush with the main housing.

FIG. 4 shows the cover 16 in a raised position while the keypad 14 is in a lowered position. An electrical connection through, for example, the hinge 30 supports communication and power between the keypad 14 and the base 12. The device 10 functions primarily as a phone when the keypad 14 is in a lowered position. Information relevant to a phone call is displayed on the viewable portion 34 of the display 18 when the keypad 14 is in a lowered position. Thus, in this position, the device 10 is operated as a conventional cellular telephone, including the display of information, etc.

Figure 5:
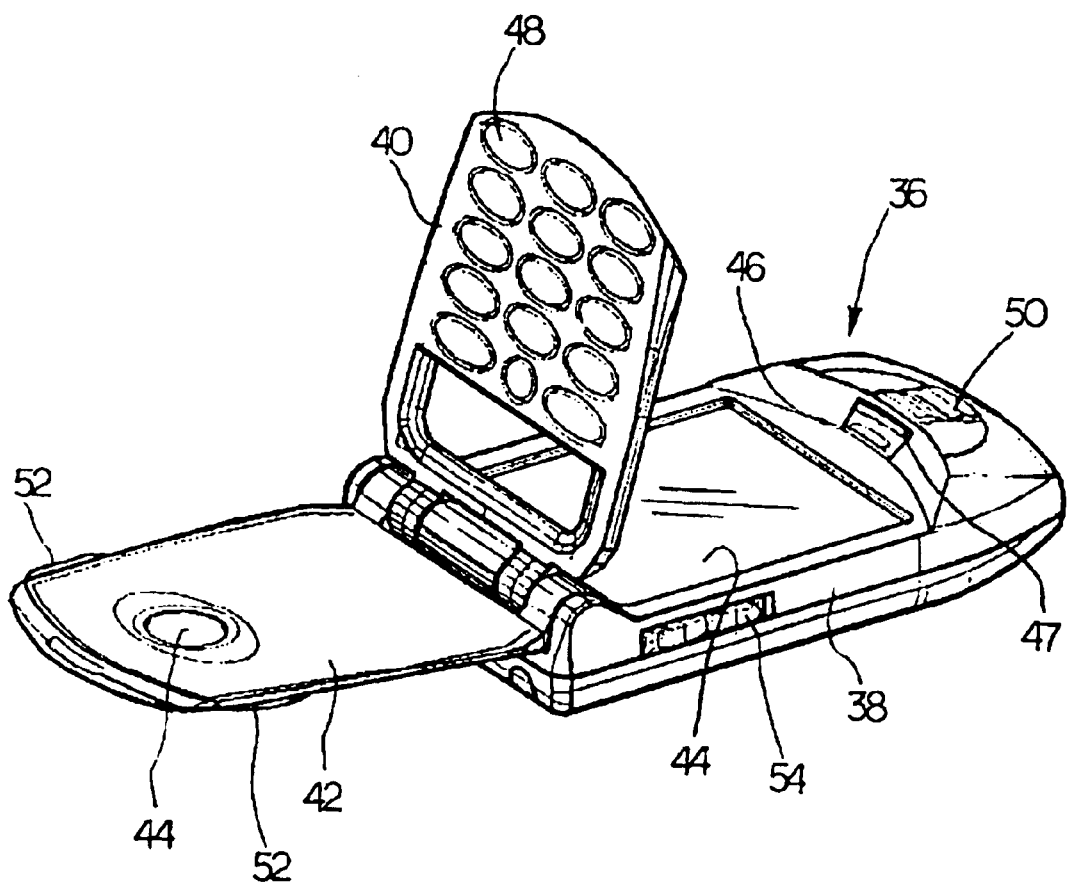
FIG. 5 is a perspective view of a second embodiment of the PDA/telephone combination device with a keypad raised to expose a PDA display.

FIG. 5 shows a second embodiment of the present invention. A PDA/telephone combination device 36 includes a base 18 with a keypad 40 and a cover 42 hingably mounted to one end of the base 38. The keypad 40 hingably mounts between the base 38 and the cover 42, covering a display 44 when lowered and exposing the display 44 when raised. The display 44 is preferably touch-sensitive.

The base 44 has a clasp 46 that secures the keypad 40 to the base 38. A clasp 47 also secures the cover 42 to the base 38. The keypad 40 has buttons 48 for operating the device 36 as a telephone. The cover 42 includes a speaker 44, which a user may place against his ear in order to hear a conversation. Operational buttons 50 mount to the base 38 and are used for phone and PDA functions. Wings 52 along either side of the cover 42 assist in raising and lowering the cover 42. Function buttons 54 are on either side of the device 36. A battery (not shown) is in either the cover 42 or the base 38.

Figure 6:
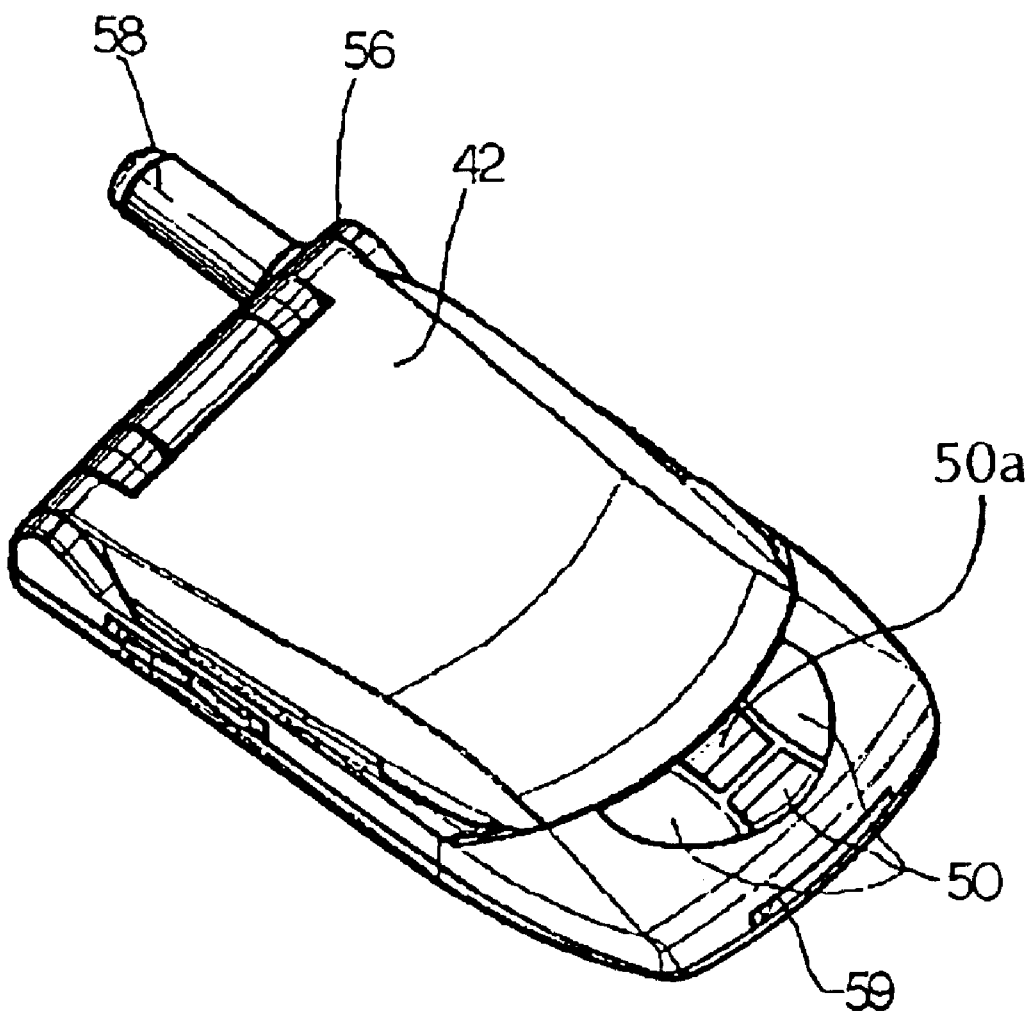
FIG. 6 is a perspective view of the device shown in FIG. 5 with a cover in a closed position.

FIG. 6 shows the device 36 with the cover 42 in a closed position. One aspect of the present invention is accessibility to operational buttons 50 and 50a while the cover 42 is in a closed position. Button 50a is utilized to release clasp 46. Preferably, a hinge 56 biases the cover 42 in an open or closed position. An antenna 58 provides wireless radio transmission and reception for the device 36. A microphone 59 is disposed along the bottom of the base 38.

Figure 7:
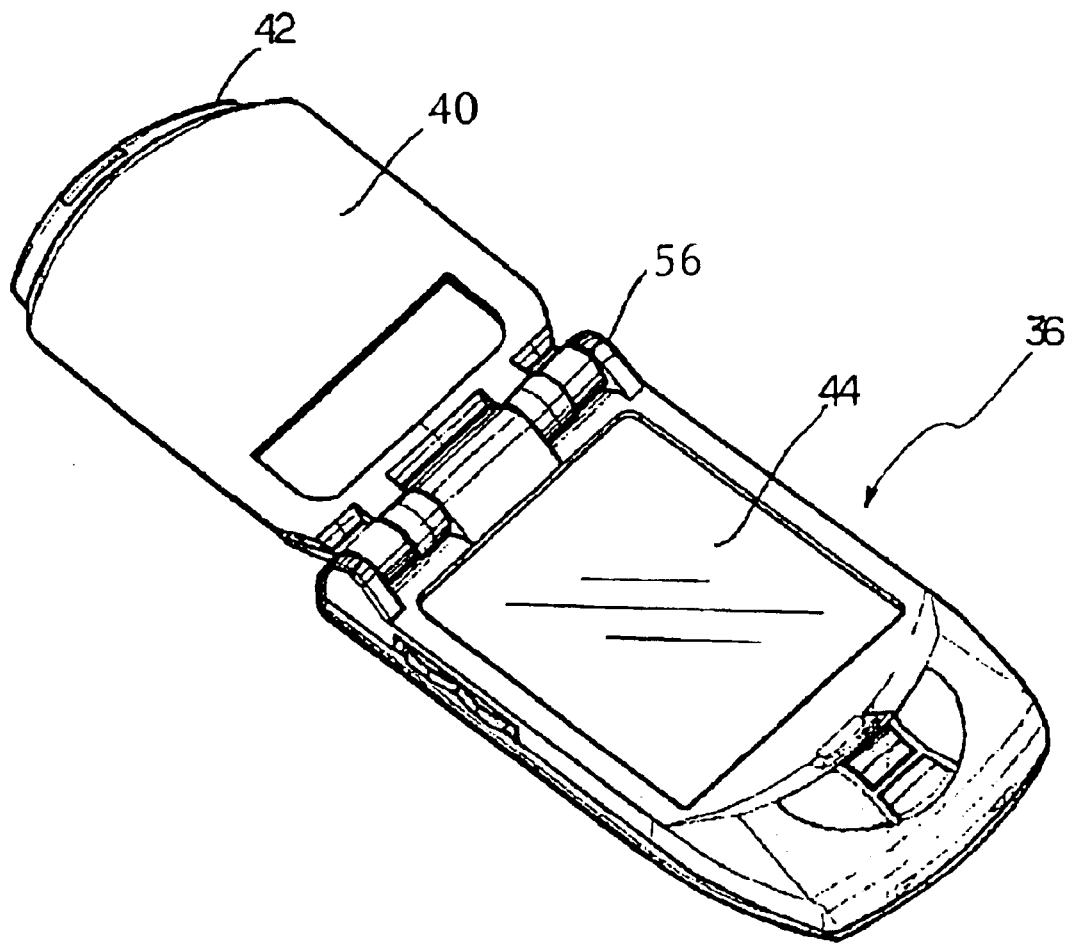
FIG. 7 is a perspective view of the device shown in FIG. 5 with the keypad raised so that it is flush with the cover.

FIG. 7 shows the cover 42 and the keypad 40 in a raised position. This position is desirable for the device 36 to operate as a PDA, with the screen 44 fully exposed. The device 36 functions as a phone with the keypad 40 in a raised position by transmitting information from a memory (not shown) stored in the device 36 to a recipient device using wireless communication.

Figure 8:
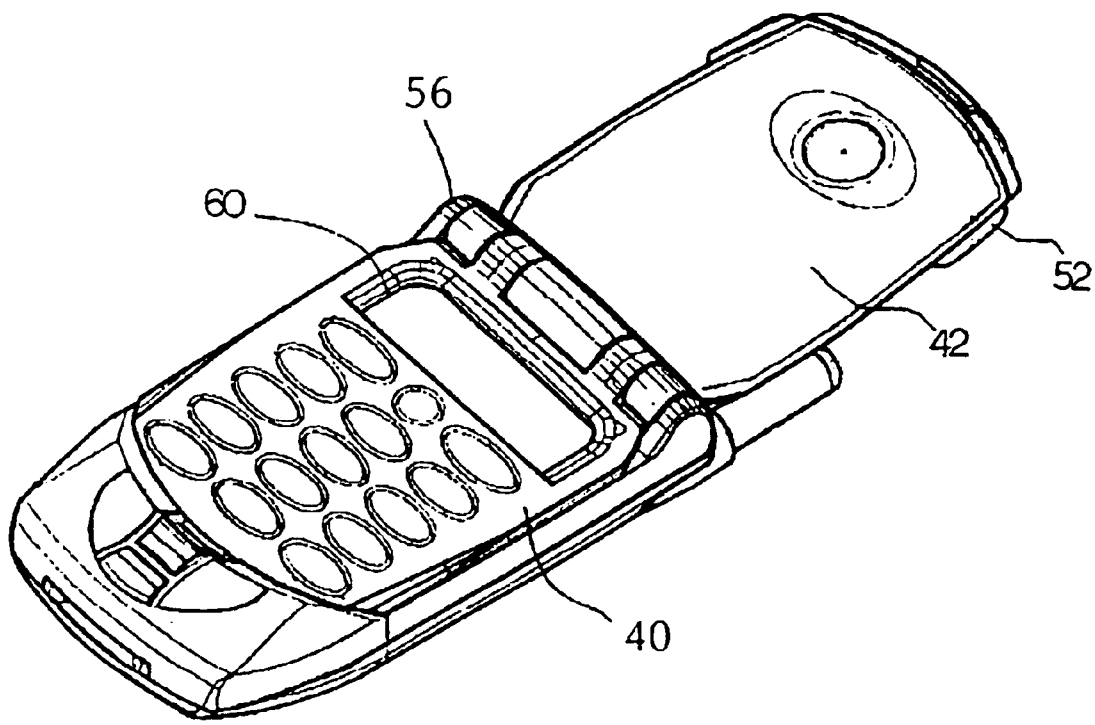
FIG. 8 is a perspective view of the device shown in FIG. 5 with the keypad lowered so that it is flush with the main housing.

FIG. 8 shows the cover in a raised position while the keypad 48 is in a lowered position. An electrical connection through, for example, the hinge 56 supports communication and power between the keypad 40 and the base 38. The device 36 functions primarily as a phone when the keypad 40 is in a lowered position. Information relevant to a phone call is displayed through a window 60 on the viewable portion of the display 44 when the keypad 40 is in a lowered position. Thus, in this position, the device 36 is operated as a conventional cellular telephone, including the display of information, etc.

Figure 9:
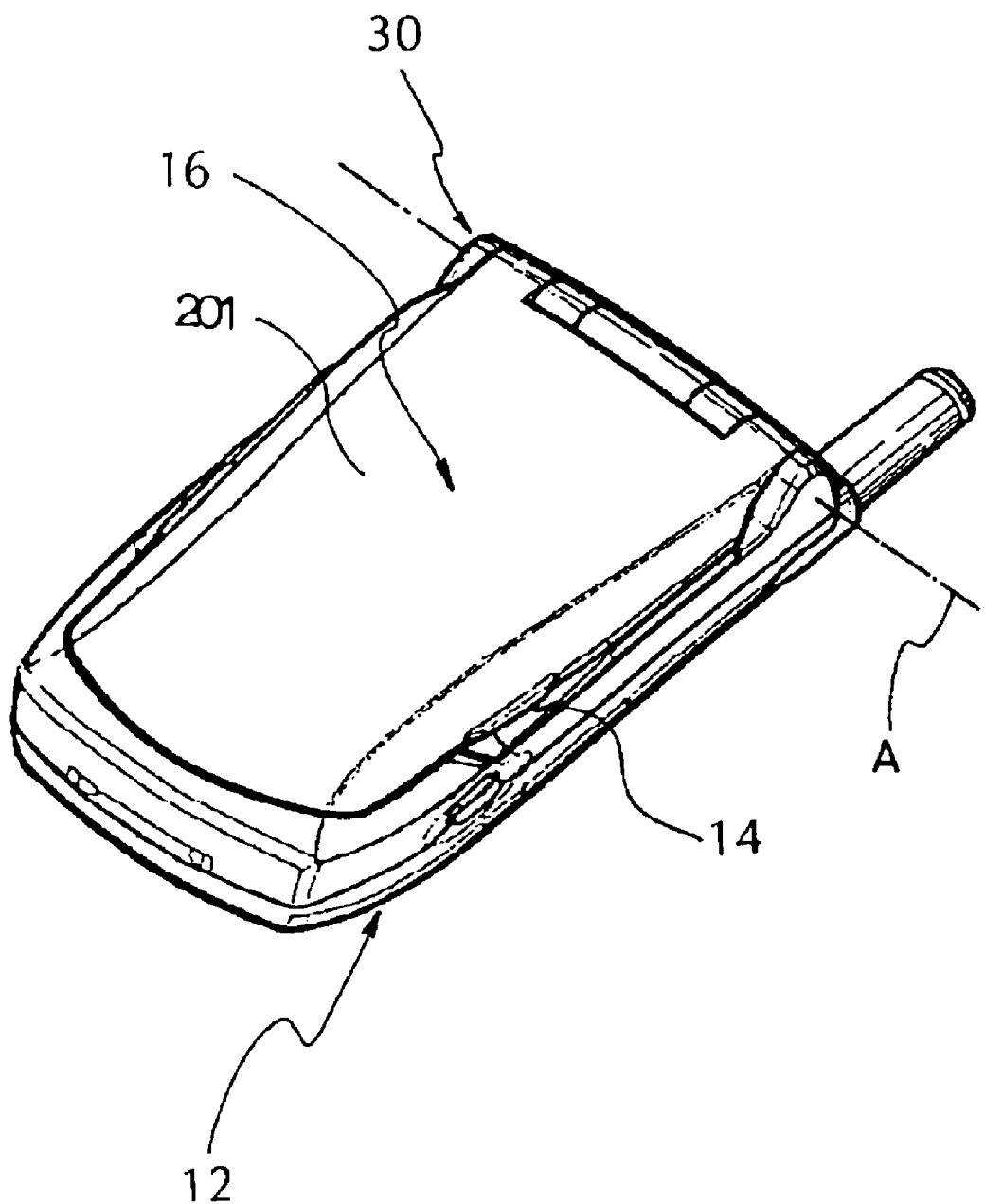
FIG. 9 is a perspective view of a third embodiment of the PDA/telephone combination device with a speaker housing in a closed position.

FIG. 9 is a perspective view of a third embodiment of the PDA/telephone combination device with a speaker housing in a closed position. Referring to FIG. 9, the device includes three housings 12, 14, and 16 connected to a hinge 30. Specifically, the three housings 12, 14, and 16 are a main housing, a bi-directional key pad housing, and a speaker housing, where the keypad 14 is positioned between the main housing 12 and the speaker housing 16, respectively. The three housings 12, 14, and 16 can be raised to a predetermined angle for a conversation on a hinge axis A. The communication angle is an angle at which the speaker housing 16 or the bi-directional key pad housing 14 is rotatable with respect to the main housing 12. As shown in FIG. 9, when the device is inoperative, the speaker housing 16 and the bi-directional key pad housing 14 are lowered to the main housing 12. Thus, the device has the main housing 12, the bi-directional key pad housing 14 hingably mounted to the main housing 12, and the speaker housing 16 hingably mounted to the key pad housing 14. When the bi-directional key top housing 14 is raised, the speaker housing 16 is also raised.

Figure 10:
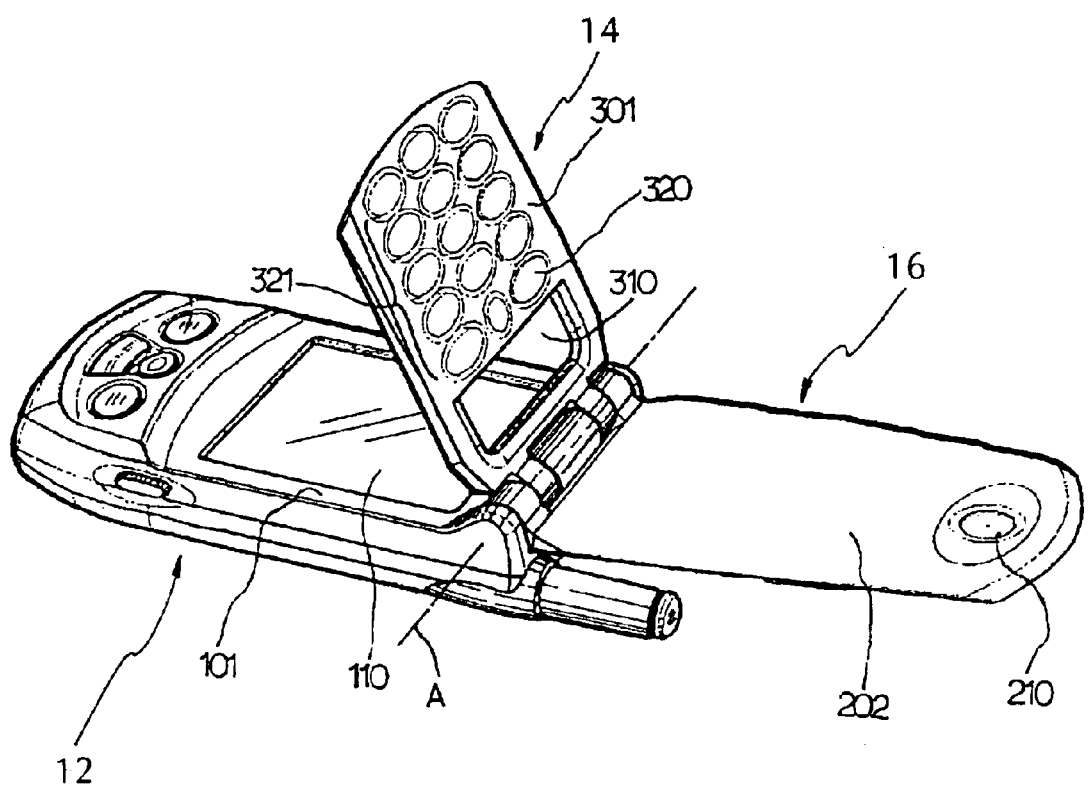
FIG. 10 is a perspective view of the device shown in FIG. 9 with a key pad housing raised.
Figure 11:
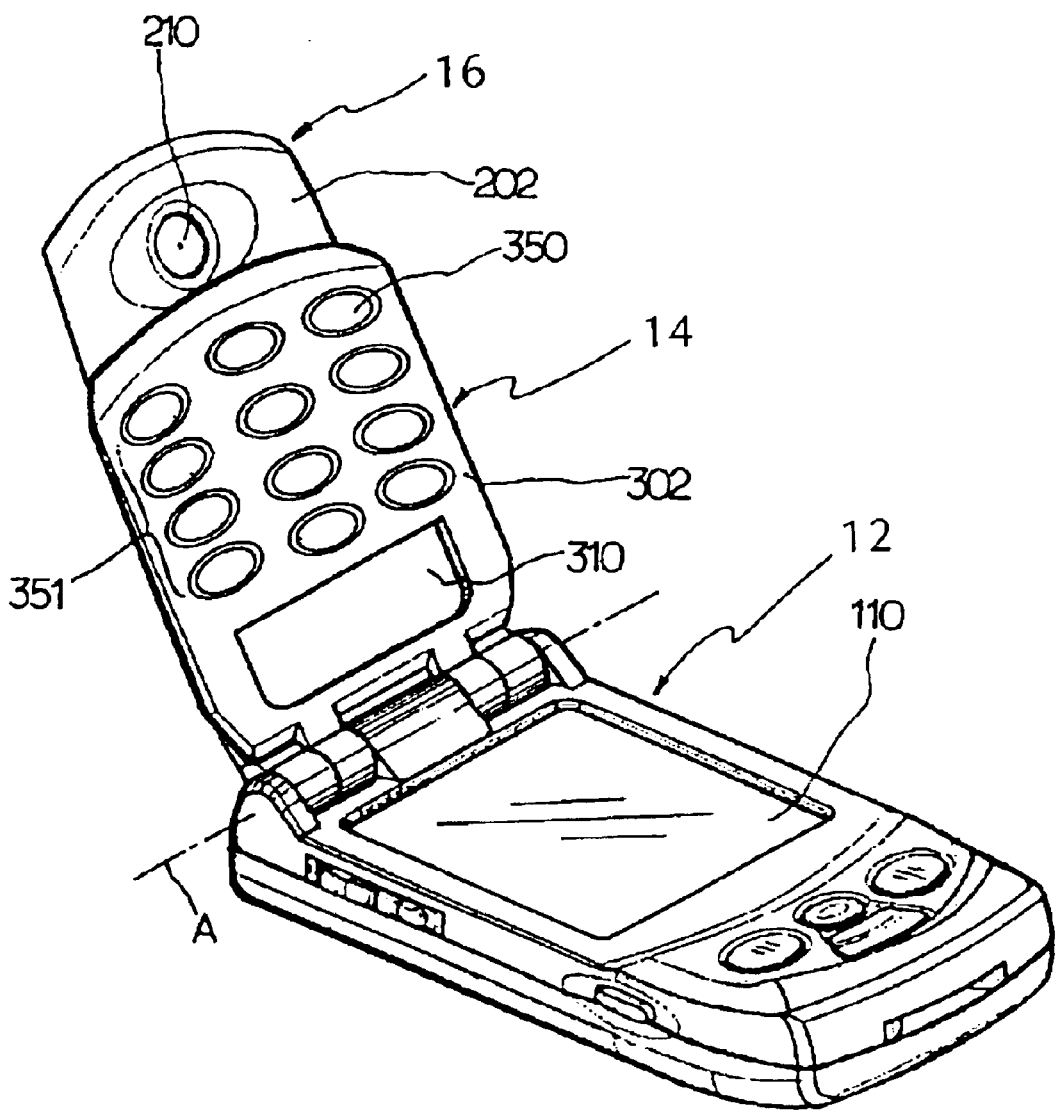
FIG. 11 is a perspective view of the device shown in FIG. 9 with the key pad housing in an open position.
Figure 12:
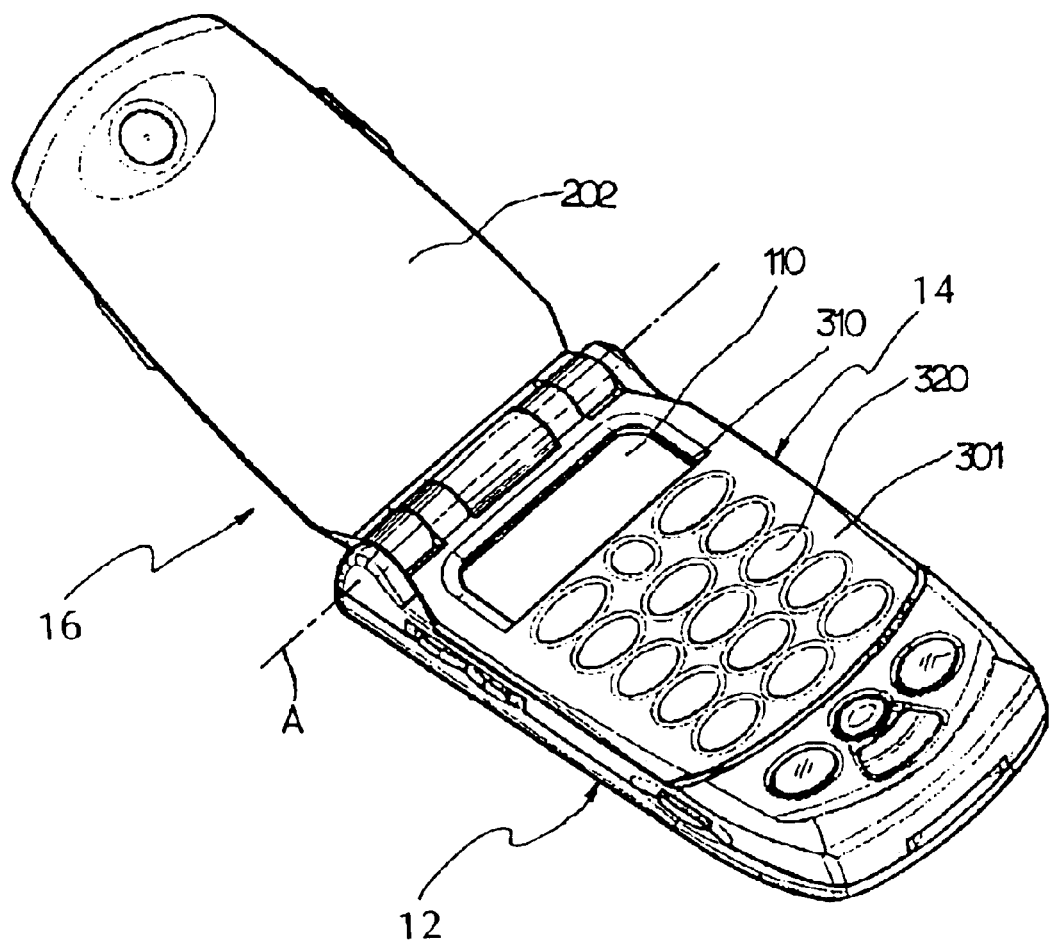
FIG. 12 is a perspective view of the device shown in FIG. 9 with the speaker housing in an open position.

Referring to FIGS. 10, 11, and 12, the speaker housing 16 includes a top surface 201 and a bottom surface 202. A speaker 210 is mounted at a predetermined position of the bottom surface 202. The bi-directional key pad housing 14 has a first keypad 321 being an array of first keys 320 on its top surface 301 and a second keypad 351 being an array of second keys 350 on its bottom surface 302. A first opening 310 is formed through the top surface 301 and the bottom surface 302 of the bi-directional key pad housing 14. The first keypad 321 preferably includes a plurality of digit keys and keys such as a send key and a power key for the device as a cellular phone for voice communication. The second keypad 351 preferably includes character keys, scroll keys, and function keys in consideration of user friendliness for Internet communication and e-mail. However, since this is a mere exemplary application, the keys can be arranged on the first keypad 321 and the second keypad 351 in different ways. For example, the first keypad 321 may have primarily character keys, while the second keypad 351 may have digit keys.

The first opening 310 is used to view data displayed on a wide LCD 110 of the main housing 12 without raising the bi-directional key pad housing 14. The data may include date, time, antenna reception sensitivity, battery state, etc., which are usually represented as icon images in an upper portion of the LCD 110. Therefore, the first opening 310 is disposed at a position corresponding to the upper portion of the LCD 110.

The main housing 12 has the wide LCD 110 across a large area on its top surface 101. A touch screen can be used instead of the wide LCD 110. In this case, a known touch-sensitive panel is provided. A user can input/output data through the wide LCD 110.

When the speaker housing 16 is in a closed position, the main housing 12, the bi-directional key pad housing 14, and the speaker housing 16 are stacked sequentially.

To make a call, a user raises the speaker housing 16 from the bi-directional key pad housing 14, as shown in FIG. 12. For Internet access or e-mail, the user raises the bi-directional key pad housing 14 from the main housing 12, as shown in FIG. 11.

Referring to FIG. 12, the wide LCD 110 is covered in the main housing, thus being protected against the external environment.

Figure 13:
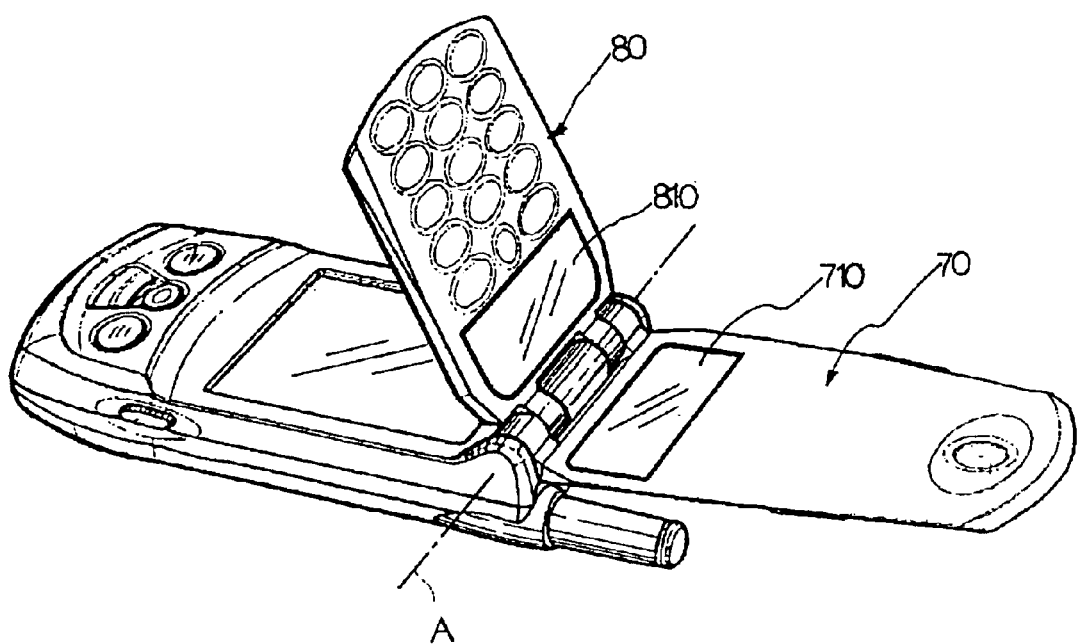
FIG. 13 is a perspective view of a fourth embodiment of the PDA/telephone combination device with a key top housing raised.
Figure 14:
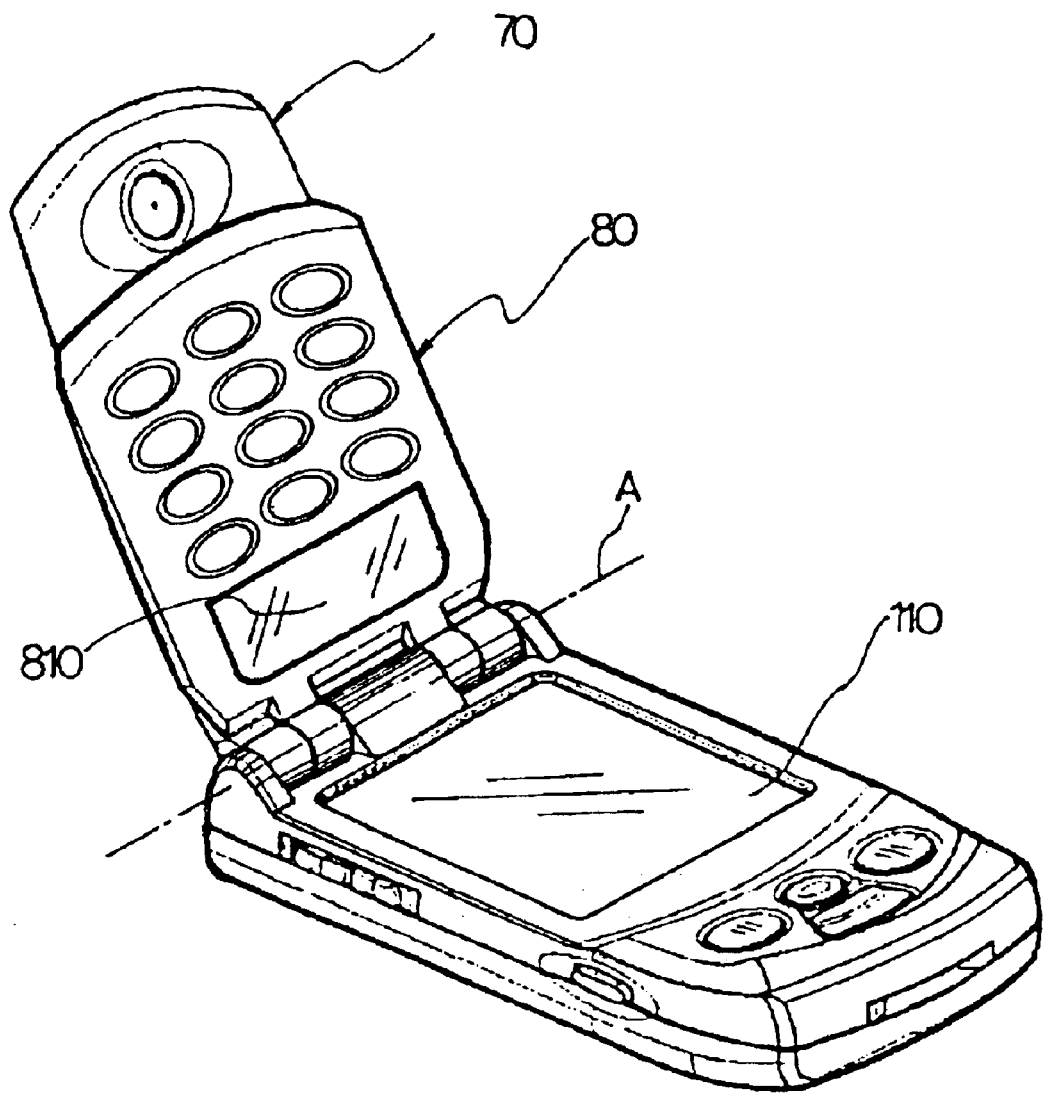
FIG. 14 is a perspective view of the device shown in FIG. 13 with the key pad housing in an open position.
Figure 15:
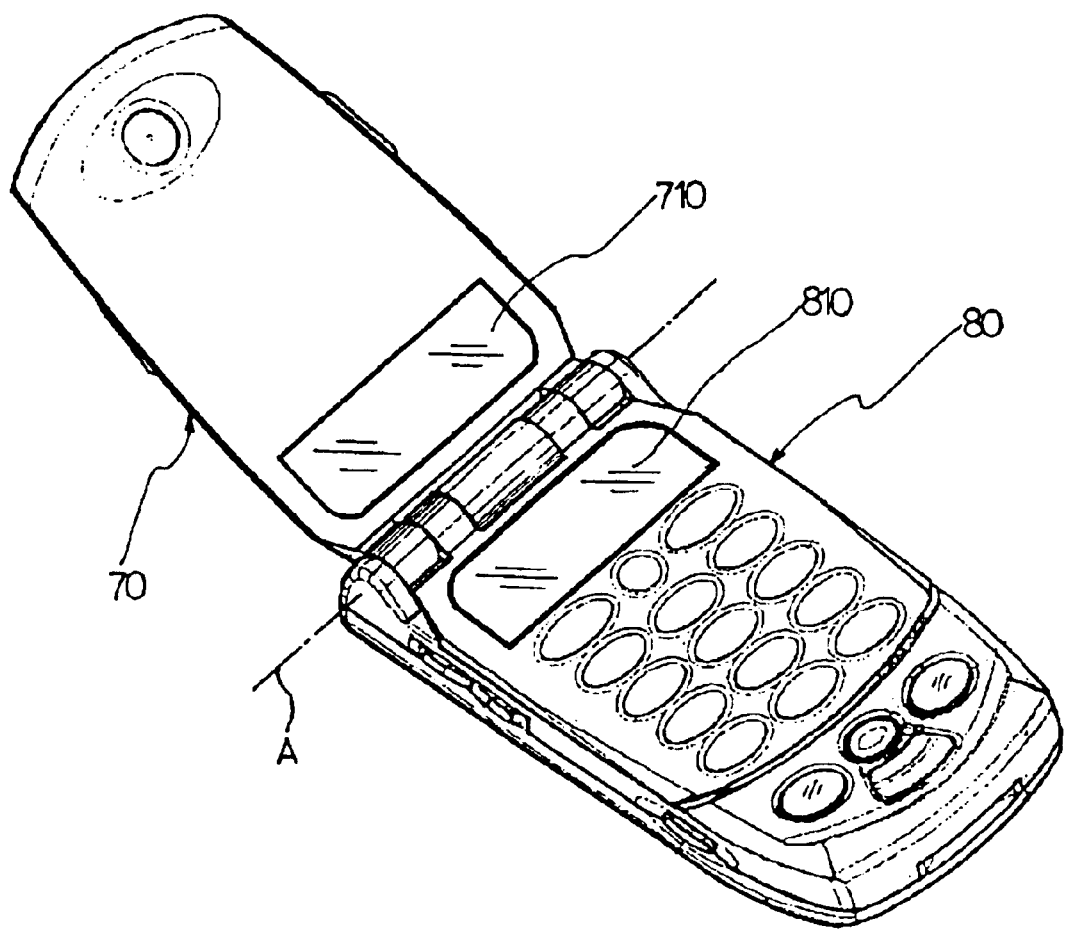
FIG. 15 is a perspective view of the device shown in FIG. 13 with the speaker housing in an open position.

Referring to FIGS. 13, 14, and 15, a PDA/telephone combination device according to a fourth embodiment of the present invention includes a first transparent window 710 in a speaker housing 70 and a second transparent window 810 in a key pad housing 80 in order to view data displayed on a wide LCD without raising the speaker housing 70. The first and second transparent windows 710 and 810 preferably are identical in shape. The fourth embodiment is the same as the third embodiment except for the first and second transparent windows 710 and 810.

Figure 16:
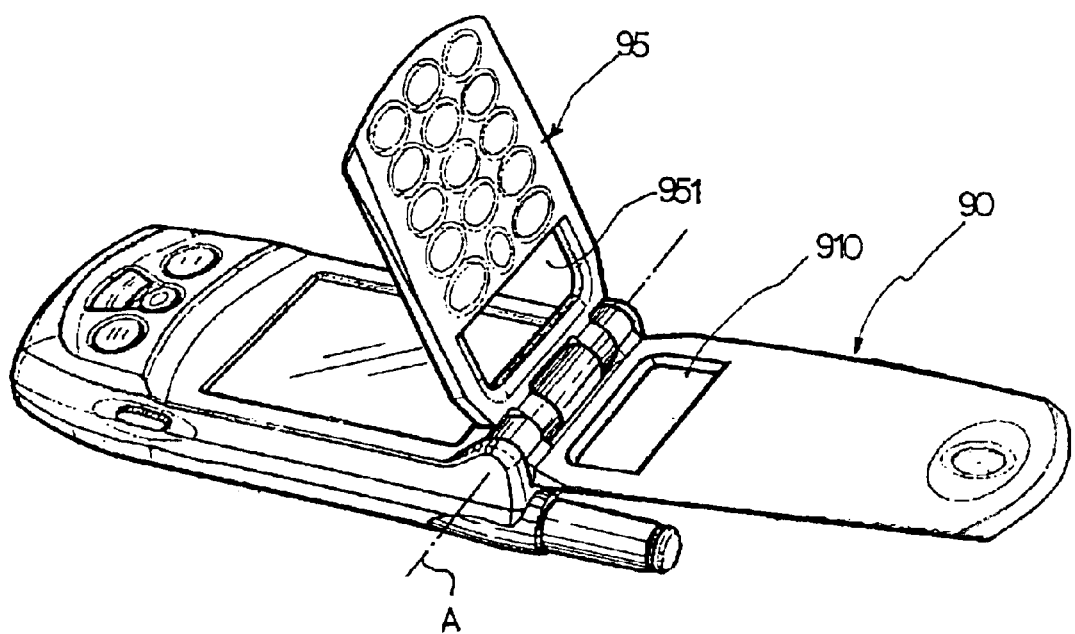
FIG. 16 is a perspective view of a fifth embodiment of the PDA/telephone combination device with a key pad housing raised.
Figure 17:
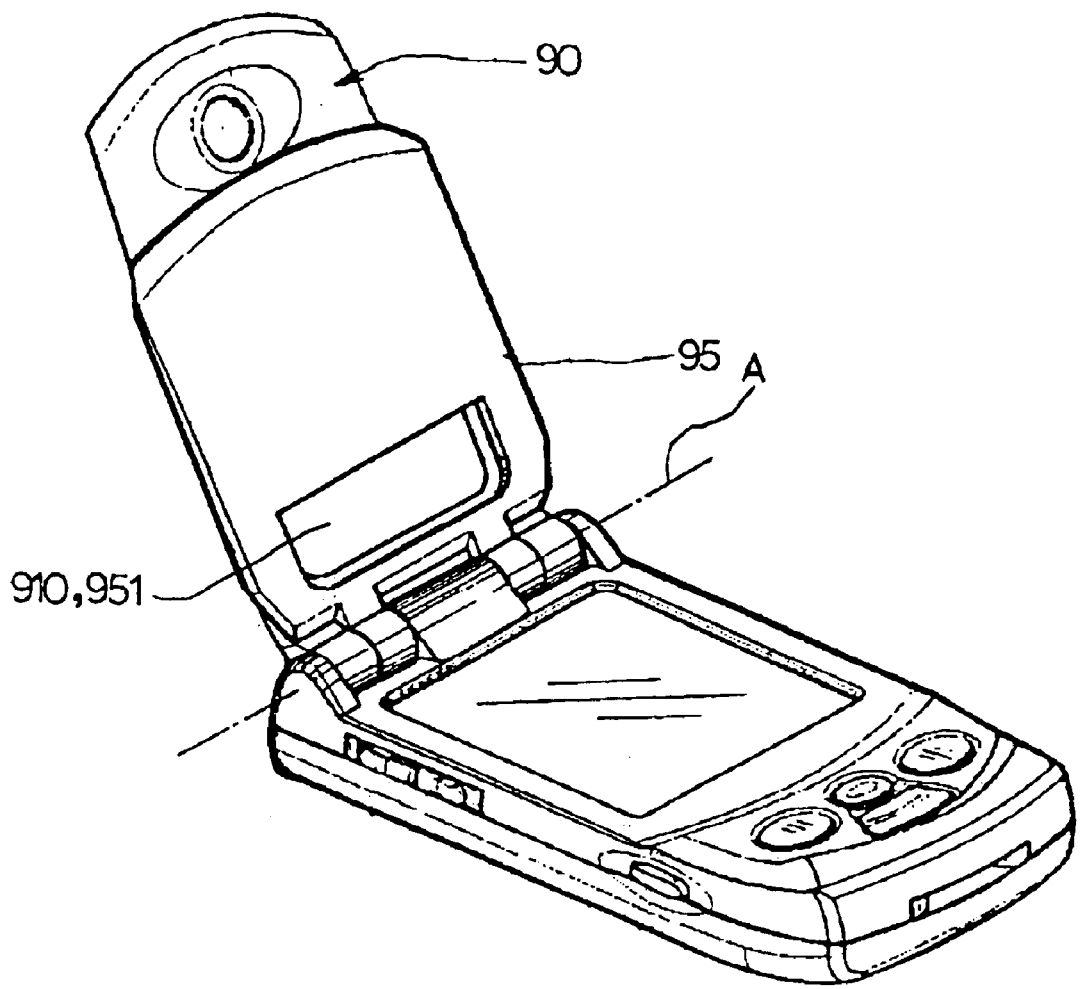
FIG. 17 is a perspective view of the device shown in FIG. 16 with the key pad housing in an open position.
Figure 18:
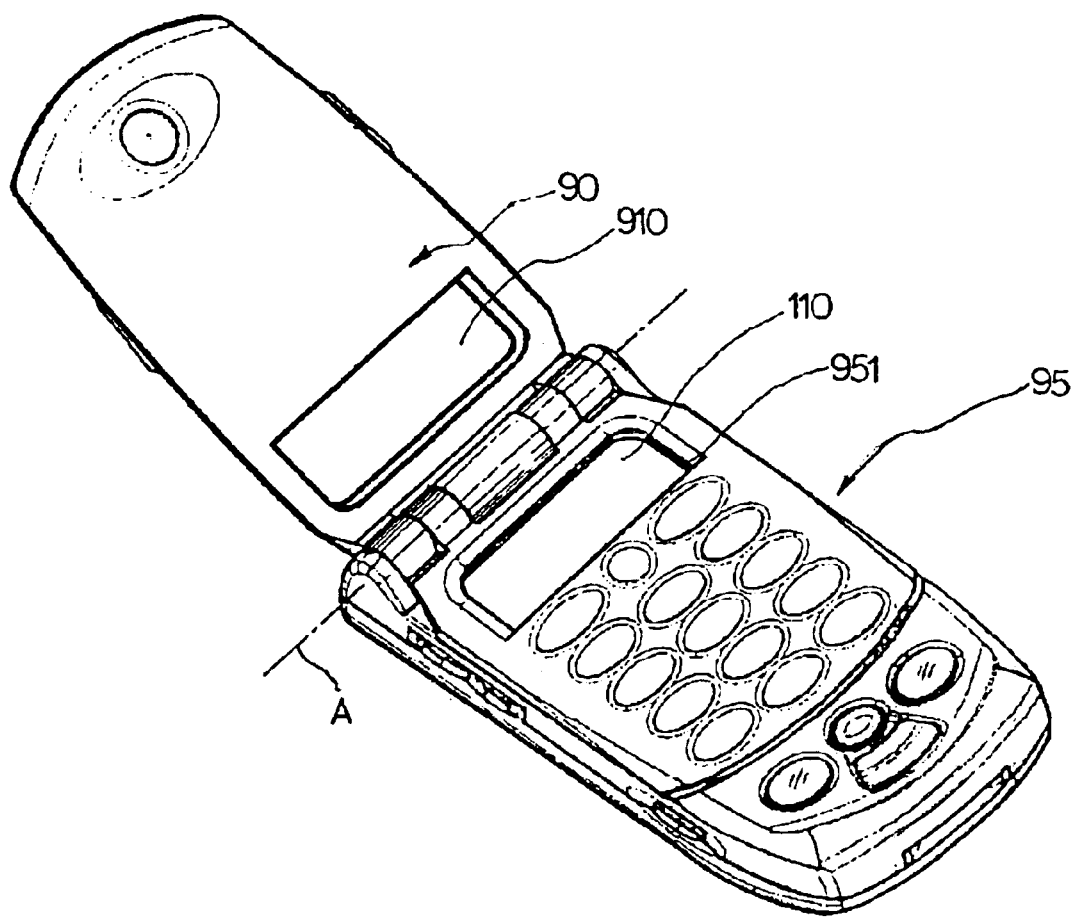
FIG. 18 is a perspective view of the device shown in FIG. 16 with the speaker housing in an open position.

Referring to FIGS. 16, 17, and 18, a PDA/telephone combination device according to a fifth embodiment of the present invention includes an opening 910 formed into a predetermined shape in a speaker housing 90 and another opening 951 in a key pad housing 95 in order to view data displayed on a wide LCD without raising the speaker housing 90. The fifth embodiment is the same as the third embodiment except for the openings 910 and 951.

Figure 19:
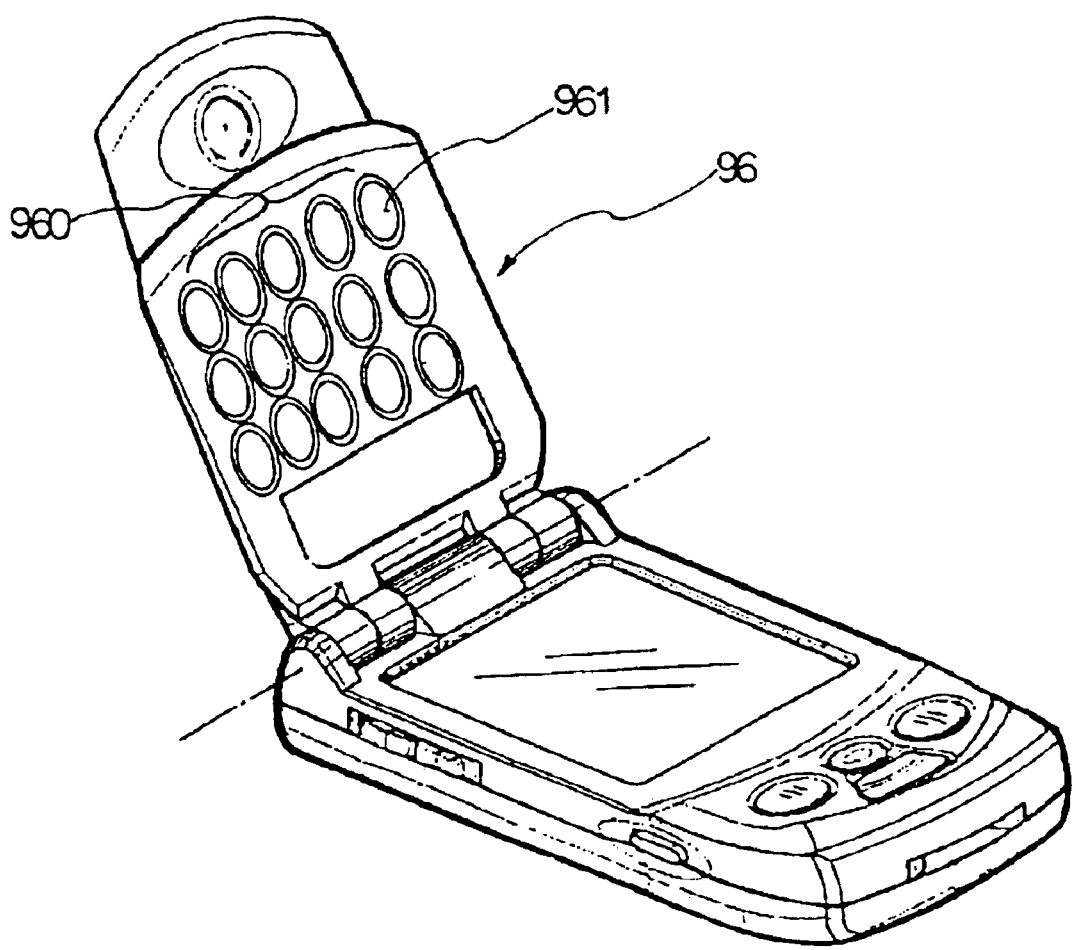
FIG. 19 is a perspective view of a PDA/telephone combination device with a key pad housing in an open position.

FIG. 19 is a perspective view of a sixth embodiment of the PDA/telephone combination device with the bi-directional key pad housing 80 in an open position according to the present invention. Referring to FIG. 19, in view of frequent use of character keys for Internet communication and e-mail, characters or symbols are marked on keys 961 of the bottom surface of a bi-directional key pad housing 96 in a horizontal direction when the device is unfolded right and left like a book in order to facilitate user data entry. Data input through a keypad 960 is also displayed in the same direction on a wide LCD.

As described above, a PDA/telephone combination device of the present invention is less bulky and has an extended data input/output function since three housings including a key pad housing are connected to one another by a single hinge. Particularly during voice communication, a wide LCD is protected from the external environment and Internet communication and e-mail are easy to do.

While the invention has been shown and described with reference to certain preferred embodiments thereof, it will be understood by those skilled in the art that various changes in form and detail may be made therein without departing from the spirit and scope of the invention. For example, more than three housings may be connected to one another by a single hinge and as more housings are added, more functions can be provided to a user. Therefore, the scope and spirit of the invention are defined by the appended claims.

What is claimed is:

1. A personal digital assistant (PDA)/telephone combination device comprising:
   a base;
   a screen coupled to the base; and
   a bi-directional keypad hingably mounted between a cover and the base, wherein the bi-directional keypad comprises a first keypad having a first plurality of keys on a first surface facing the base and a second keypad having a second plurality of keys on a second surface facing the cover, and the bi-directional keypad provides a partial view of the screen when in a lowered position adjacent to the base with the cover opened away from the base, and a full view is provided of the screen when the bi-directional keypad is in a raised position.

2. The device of claim 1, wherein the partial view of the screen is provided through an opening in a housing in which the bi-directional keypad is mounted.

3. The device of claim 2, further comprising a transparent window which covers the opening in the bi-directional keypad housing.

4. The device of claim 2, further comprising an opening in the cover that corresponds to the opening in the bi-directional keypad housing.

5. The device of claim 1, wherein the screen displays telephone information when the bi-directional keypad is in the lowered position and the screen displays PDA information when the bi-directional keypad is in the raised position.

6. The device of claim 1, further comprising control buttons coupled to the base such that the control buttons are covered when the cover is closed and uncovered when the cover is opened.

7. The device of claim 1, further comprising control buttons coupled to the base such that the control buttons are uncovered when the cover is closed or opened.

8. A PDA/telephone combination device comprising:

a main housing;

a speaker housing capable of being raised from and lowered to the main housing;

hinge means by which the main housing is connected to the speaker housing; and a key pad housing connected to the hinge means, disposed between the main housing and the speaker housing and capable of being raised from and lowered to the main housing, and having a plurality of keys.

9. The device of claim 8, wherein the main housing includes one of a touch screen and a wide LCD.

10. The device of claim 8, wherein the keypad housing is a bi-directional keypad housing and further comprises a first key pad having a plurality of keys on a top surface of the key pad housing and a second key pad having a plurality of keys on a bottom surface of the key pad housing.

11. The device of claim 10, wherein the keys of the first keypad are an array of digit keys with digits marked in a vertical direction.

12. The device of claim 10, wherein the keys of the second keypad is an array of character keys or function keys.

13. The device of claim 10, wherein the keys of the second keypad are an array of keys with marks made in a horizontal direction.

14. The device of claim 8, wherein the key pad housing is a single directional key pad housing and further comprises a keypad having the plurality of keys on one of a top surface and a bottom surface of the key pad housing.

15. The device of claim 8, wherein the keypad is on a top surface of the key pad housing.

16. The device of claim 8, wherein the key pad housing further comprises a first opening of a predetermined shape to provide a view of data on the main housing.

17. The device of claim 8, wherein the key pad housing further comprises a first transparent window of a predetermined shape to provide a view of data on the main housing.

18. The device of claim 16, wherein the speaker housing comprises a second opening of a predetermined shape to provide a view of data.

19. The device of claim 17, wherein the speaker housing comprises a second transparent window of a predetermined shape to provide a view of data.

* * * * *